(No Model.) 2 Sheets—Sheet 2.
J. BARRETT.
WATER CLOSET FITTING.
No. 542,818. Patented July 16, 1895.
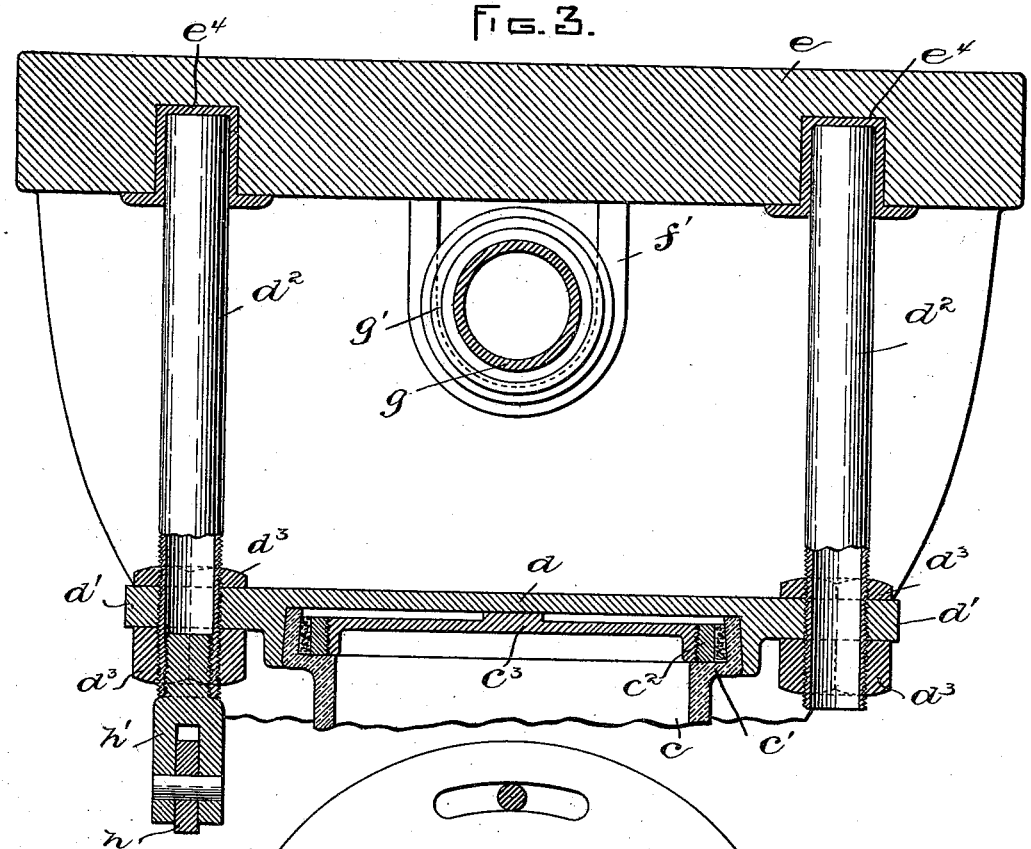
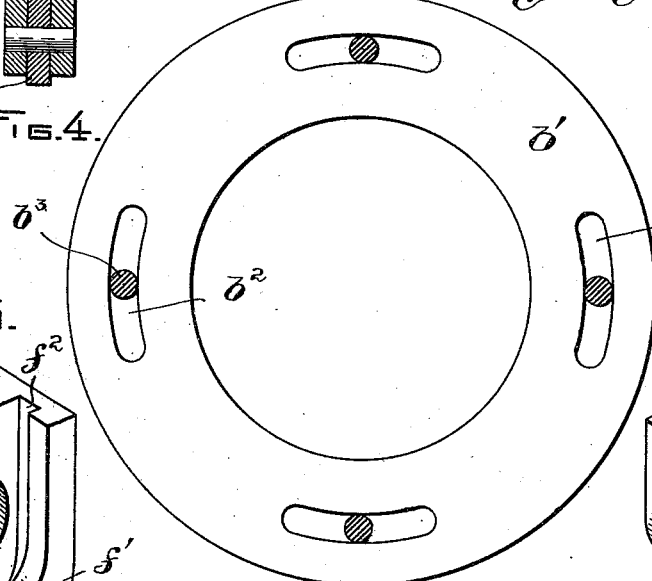
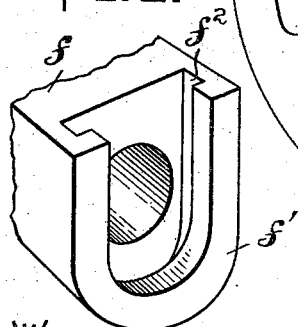
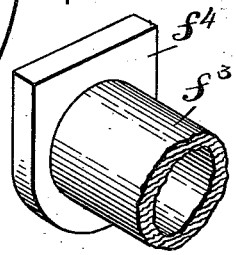
WITNESSES:
INVENTOR:

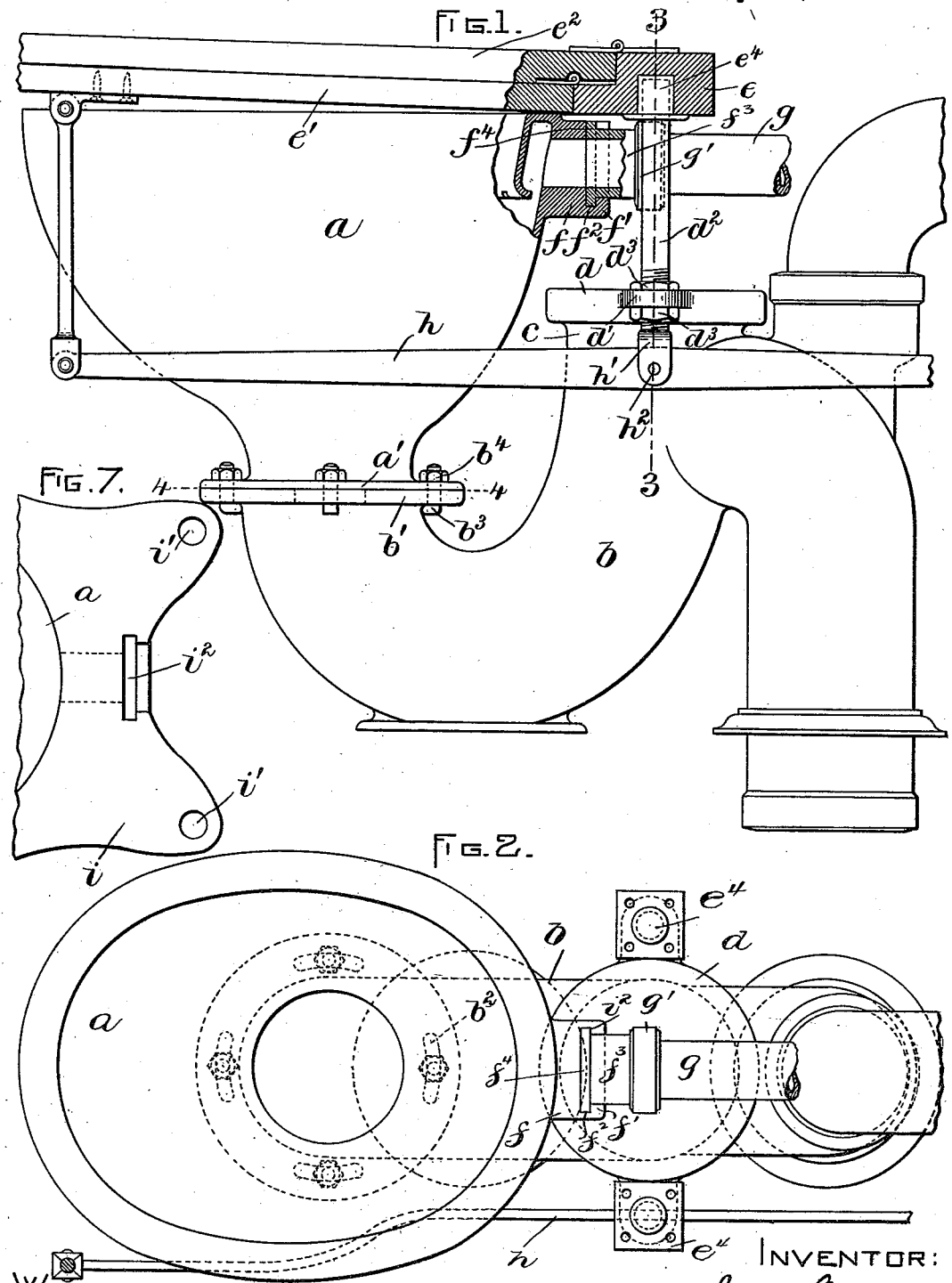

UNITED STATES PATENT OFFICE.

JAMES BARRETT, OF BOSTON, MASSACHUSETTS.

WATER-CLOSET FITTING.

SPECIFICATION forming part of Letters Patent No. 542,818, dated July 16, 1895.

Application filed August 24, 1894. Serial No. 521,163. (No model.)

*To all whom it may concern:*

Be it known that I, JAMES BARRETT, of Boston, in the county of Suffolk and State of Massachusetts, have invented certain new and useful Improvements in Water-Closet Fittings, of which the following is a specification.

The present invention has in view certain improvements in water closet fittings calculated to render the trap more accessible for cleaning purposes, to render the seat readily removable, at the same time holding it against accidental movement when in place, and to generally combine the elements to produce a superior structure in point of compactness, strength, and durability.

To the above ends the invention consists in a number of novel constructions and combinations of parts, which are recited in the appended claims.

The accompanying drawings illustrate an embodiment of the invention and form a part of this specification.

Figure 1 shows a partial side elevation and partial section of the complete fitting. Fig. 2 shows a top plan view of the same with the seat removed. Fig. 3 shows a vertical section on line 3 3 of Fig. 1. Fig. 4 shows a horizontal section on line 4 4 of Fig. 1. Figs. 5 and 6 show perspective views of members of a joint between the bowl and the water-supply pipe. Fig. 7 shows a modification in the seat-supporting means.

In the drawings, the letter $a$ designates the bowl, and $b$ the usual trap, formed by a pipe having a double bend or ogee curve. It frequently happens that adjustment of the trap rotatively with respect to the bowl is demanded by the condition of surroundings, and one improvement of mine facilitates such an adjustment. The bowl $a$ has an annular base flange $a'$, which rests on a corresponding flange $b'$ at the end of the trap $b$. The latter flange is formed with a number of arc-shaped slots $b^2$, (see Fig. 4,) and bolts $b^3$ are introduced through these slots from the under side and through holes in the flange $a'$, above which they receive nuts $b^4$. When these nuts are loosened, it will be obvious that a rotative adjustment of the trap is permitted, limited by the extent of the slots $b^2$. By simply tightening up these nuts the bowl and trap are securely clamped together.

I provide for gaining access to the trap, and particularly the lower bend of the same, by forming at the upper end an upwardly-projecting nipple $c$, which is formed with an annular offset $c'$ at the top for receiving an internally screw-threaded ring $c^2$, of brass or other suitable material, said ring being calked, as shown, to make it secure. The nipple is closed by a cap $c^3$, which screws into said ring and has provisions for unscrewing it readily when it is desired to open the trap. A flanged cover $d$ fits over the nipple $c$ and is formed at two opposite sides with ears $d'$; and studs $d^2$, here shown as tubular, are supported by said ears, the said studs being externally screw-threaded for a distance at the lower ends, which are entered through the ears and locked by nuts $d^3$, turned on said threaded ends above and below the ears. The studs $d^2$ project upwardly behind the bowl a sufficient distance to support the seat, which is made up of a cross-bar $e$, a seat proper $e'$, hinged to said bar, and a cover $e^2$, also hinged to the bar. Said bar $e$ is bored in its under side to receive a pair of metallic tubular flanged sockets $e^4$, and the latter fit over the two studs $d^2$, so that the cross-bar is supported and held in place by them, while at the same time the seat can be readily removed by simply lifting it off the studs. On the rear side of the bowl near the top a boss $f$ is formed around a water-inlet opening, and at the rear end of this boss there is a U-shaped flange $f'$ with an internal groove $f^2$ opening out of its top.

A pipe-nipple $f^3$ having a U-shaped flange $f^4$ is fitted to the boss $f$ by sliding its flange down the groove $f^2$. The water-supply pipe $g$ is coupled to the nipple $f^3$ by an internally screw-threaded sleeve $g'$ turning on an externally-threaded portion of the nipple and suitably fastened to the supply-pipe. It will be seen that the manner of connecting the water-supply pipe to the bowl is a very simple and effective one.

I make use of one of the studs $d^2$ as a support for a lever $k$, which constitutes a member of valve-controlling connections between the seat and the water supply, said tube having a hanger $h'$ supporting the pivot $h^2$ of said lever.

In Fig. 7, which illustrates a modification in the seat-supporting means, the bowl is shown as formed with an extended flange $i$, in which seat-supporting studs $i'$ are fastened, and this flange takes the place of the boss $f$, being formed at its center with a socket or depression $i^2$ to receive the pipe-nipple to which the water-supply pipe is coupled.

What I claim as my invention is as follows:

1. In a water-closet fitting, the combination of the bowl, the ogee trap, studs rising from the upper bend of said trap at opposite sides of the same and supported thereby, a seat-piece having sockets which fit over said studs, and seats attached to said seat-piece and extending over the bowl.

2. In a water-closet fitting, the combination of a trap having a clean-out opening at the upper side of its top-bend, a cover for said opening having ears at opposite sides, vertical studs supported by said ears, and a seat-piece having sockets fitting over said studs.

3. In a water-closet fitting, the combination of a trap having a clean-out opening at the upper side of its top-bend, a cover for said opening having ears at opposite sides, vertical studs supported by said ears, a seat-piece having sockets fitting over said studs, and valve connections including a lever pivoted to one of the said studs.

In testimony whereof I have signed my name to this specification, in the presence of two subscribing witnesses, this 14th day of August, A. D. 1894.

JAMES BARRETT.

Witnesses:
HORACE BROWN,
WILLIAM QUINBY.